United States Patent [19]
Gotou et al.

[11] Patent Number: 4,578,325
[45] Date of Patent: Mar. 25, 1986

[54] POWER STORAGE SYSTEM USING SODIUM-SULFUR BATTERIES

[75] Inventors: Tadashi Gotou; Fumio Kawamura; Norihiko Sagawa; Hideo Yusa, all of Hitachi, Japan

[73] Assignee: Hitachi, Ltd., Tokyo, Japan

[21] Appl. No.: 581,270

[22] Filed: Feb. 17, 1984

[30] Foreign Application Priority Data

Feb. 18, 1983 [JP] Japan ................... 58-24611

[51] Int. Cl.⁴ .......................................... H01M 10/48
[52] U.S. Cl. ..................... 429/91; 429/104; 429/120; 429/191; 429/121
[58] Field of Search ............ 429/104, 8, 120, 191, 429/91, 121

[56] References Cited

U.S. PATENT DOCUMENTS

| | | | |
|---|---|---|---|
| 3,535,163 | 10/1970 | Dzieciuch et al. | 429/104 |
| 3,837,918 | 9/1974 | Nakabayashi | 429/104 |
| 4,006,281 | 2/1977 | Markin | 429/104 X |
| 4,038,465 | 7/1977 | Ludvig | 429/104 |
| 4,044,191 | 8/1977 | Evans et al. | 429/104 |
| 4,424,262 | 1/1984 | von Alpen et al. | 429/104 X |

Primary Examiner—Charles F. LeFevour
Attorney, Agent, or Firm—Antonelli, Terry & Wands

[57] ABSTRACT

A sodium-sulfur battery comprising molten sodium as an active material for a minus pole and molten sulfur as an active material for a plus pole, the molten sodium and molten sulfur being partitioned from each other by a sodium ion-permeating solid electrolyte such as β-alumina as a boundary is provided with a sodium storage tank communicated with the molten sodium in the battery cell, a draining mechanism for withdrawing the molten sodium, when desired, from the battery cell into the sodium storage tank, and a circulating mechanism for purifying and returning the sodium from the sodium storage tank to the battery cell as the molten sodium, sodium can be discarged urgently from the battery at an accident of direct contact between the sodium and sulfur, with the result of improved safety. A power storage system comprising a plurality of the sodium-sulfur batteries connected to one another in series and further connected in parallel can be provided with common sodium storage tanks and relevant draining mechanisms, purifying and circulating mechanisms in equal potential level rows of the batteries, resulting in improved economy and safety.

26 Claims, 4 Drawing Figures

POWER STORAGE SYSTEM USING SODIUM-SULFUR BATTERIES

BACKGROUND OF THE INVENTION

This invention relates to a sodium-sulfur battery and power storage system of large capacity, using the sodium-sulfur batteries.

Sodium-sulfur batteries have been studied and developed in many countries since the principle of the sodium-sulfur battery was disclosed in 1969 [Denki Gakkai Gijutsu Hokoku (Part II) No. 103, 29-36 (October, 1980)].

In the basic structure of a sodium-sulfur battery, molten sodium is used as an active material for a minus pole, molten sulfur as an active material for a plus pole, and sodium ion-permeating solid electrolyte as an electrolyte. The solid electrolyte is a glass or a ceramic, and particularly β-alumina ($Na_2O.11\ Al_2O_3$) is used as the electrolyte in most of the batteries now under development owing to high sodium ion permeability. Furthermore, β-alumina also acts as a separator between the plus pole and the minus pole because it has no electron conductivity.

Sulfur also has no electron conductivity, and thus is impregnated in an electroconductive material to transfer electrons accompanying the electrochemical reactions. Effective working temperature for the battery is 300°-350° C. in view of the melting point of the active material for the plus pole. One example of typical structure of the battery is disclosed in Japanese Patent Application Kokai (Laid-open) No. 57-18670.

Discharging and charging reactions of the battery can be given in the following equations:

At a minus pole:

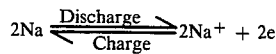

At a plus pole:

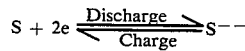

Throughout the battery:

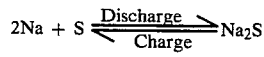

The sodium-sulfur battery has the following characteristics owing to the electrolyte being a solid and the active materials for both poles being molten liquids:

(1) No side reaction occurs at both charging and discharging, resulting in no self-discharge, and charging quantity of electricity can be equal to the discharging quantity of electricity.

(2) The battery is of a completely sealing type, resulting in no maintenance requirement.

(3) The active materials are liquids, resulting in no life limit to the battery.

(4) Capacity reduction is much less at a high rate discharging.

However, the battery has the following problems:

(1) When the solid electrolyte is damaged owing to a mechanical shock, thermal shock, etc., or cracked through attack by potassium as an impurity in sodium, there is a danger of rapid reaction between sodium and sulfur, and there are no measures for remedying the danger.

(2) Molten sulfur has a high activity and is also used at a high temperature, and corrodes a metallic vessel.

(3) Battery characteristics are deteriorated due to a decrease in purity of molten sodium and sulfur, resulting in shortened life of the battery.

SUMMARY OF THE INVENTION

An object of the present invention is to provide a sodium-sulfur battery having a structure for preventing an accident due to the reaction between both active materials as a disadvantage of the prior art, and a power storage system using such batteries.

Another object of the present invention is to provide a sodium-sulfur battery of longer life with prevention of decrease in purities of both active materials and corrosion of structural materials, and a power storage system using such batteries.

The present sodium-sulfur battery or a power storage system using the batteries has a structure for circulating molten sodium as an active material for a minus pole in a circulating loop. The circulating loop comprises a cell, a piping, a sodium storage tank, and a sodium purifier. With this structure, the molten sodium can be drained urgently to prevent an accident due to the reaction between both active materials for the poles.

According to the present invention, sulfur as an active material for a plus pole is sealed in a capsule of β-alumina, and the capsule is placed in a cell containing molten sodium. The molten sodium circulates around the lower part of the capsule. With this structure, the accident due to the reaction between both active materials can be more safely prevented, and the life of battery can be much more prolonged by sealing the sulfur liable to corrode metallic structural materials in the capsule of β-alumina.

That is, the present invention provides a sodium-sulfur battery which comprises a molten sodium chamber containing molten sodium as an active material for a minus pole and having a minus pole, at least one molten sulfur chamber containing molten sulfur as an active material for a plus pole and having a plus pole, both said chambers being partitioned by a sodium ion-permeating solid electrolyte, a sodium storage tank communicating with the molten sodium chamber, and a draining mechanism for withdrawing the molten sodium from the molten sodium chamber to the sodium storage tank, when desired.

According to the present invention, the sodium-sulfur battery having the said structure can further have a sodium circulating mechanism for purifying and returning the sodium from the sodium storage tank to the molten sodium chamber.

Furthermore, the present invention provides a power storage system using the said sodium-sulfur batteries, that is, a power storage system using sodium-sulfur batteries, which comprises a plurality of sodium-sulfur batteries each comprising a common molten sodium chamber containing molten sodium as an active material for a minus pole and having a minus pole, at least one molten sulfur chamber containing molten sulfur as an active material for a plus pole and having a plus pole, both said chambers being partitioned by a sodium ion-permeating solid electrolyte being connected in parallel to one another, thereby forming a module, a plurality of the modules being connected in series to one another, thereby forming one string, a plurality of the strings being connected in parallel to one another, thereby forming one unit, the strings each being connected to a power line through individual breakers, a common direct current reactor, and a common converter; common sodium tanks each communicating with the common molten sodium chambers of the individual modules in equal potential level rows through individual sodium draining mechanisms; and sodium circulating mechanisms for purifying and returning sodium from the common sodium storage tanks to the common molten sodium chambers of the individual modules in corresponding equal potential level rows. According to the present invention, the draining mechanism comprises a piping communicating the common molten sodium chamber to the sodium storage tank, a drain valve provided in the piping, and a means for detecting an abnormal electric discharge of the battery and controlling the drain valve, and the molten sulfur chamber is a capsule of the sodium ion-permeating solid electrolyte in which the molten sulfur is filled, and the capsule is detachably inserted in the common molten sodium chamber.

PREFERRED EMBODIMENT OF THE INVENTION

The present invention will be described in detail below, referring to embodiments in view of the accompanying drawings.

Figure 1:
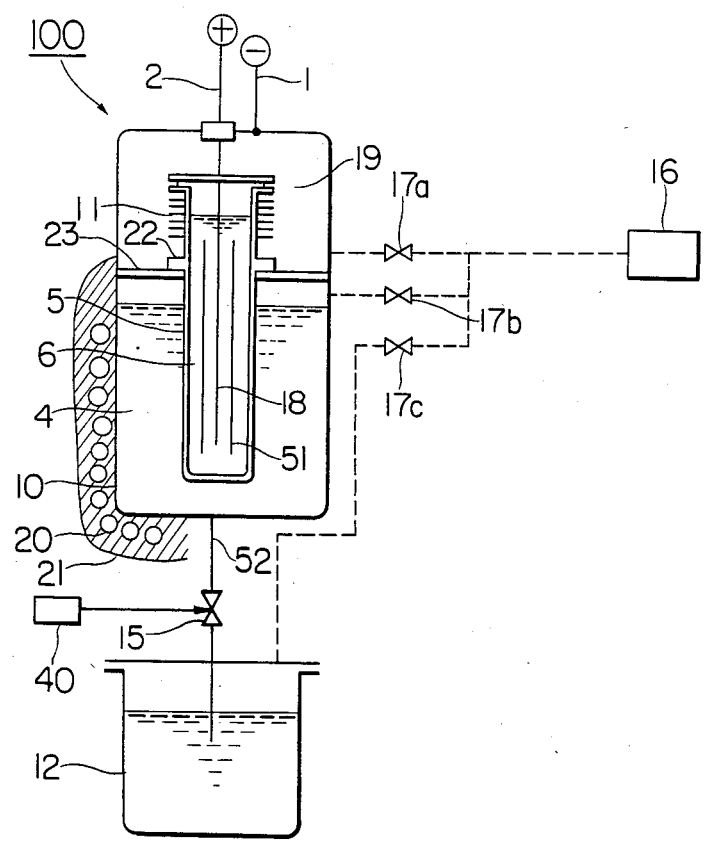
FIG. 1 is a schematic view of the structure of a sodium-sulfur battery according to one embodiment of the present invention.

In FIG. 1, a sodium-sulfur battery 100, an embodiment according to the present invention, is schematically shown, where a cylindrical, sealed cell 10 is electrically connected to a minus pole 1. The cell 10 is separated into an upper compartment and a lower compartment by a partitioning plate 23, and molten sodium 4 is placed in the lower compartment as an active material for the minus pole. A capsule 5 of β-alumina is provided through the upper compartment and the lower compartment. In the capsule 5, a cylindrical pipe 51 and an electrode 18 are provided to form an annular passage, through which molten sulfur can circulate by convection. Furthermore, molten sulfur 6 as an active material for the plus pole as impregnated in an electroconductive material, such as carbon felt, is filled in the capsule 5 to cover the entire annular passage. At the outer periphery of the capsule 5, which exists in the upper compartment, cooling fins 11 are provided. The upper compartment provides a cooling chamber 19 for the capsule 5. A cooling argon gas is supplied from an argon gas source 16 to the cooling chamber 19 through a valve 17a.

At the bottom of cell 10, a drain piping 52 is provided and connected to a sodium storage tank 12 through a drain valve 15 to form a drain system. The drain system is all made from stainless steel. At an accident due to reaction between the sodium and sulfur, the sodium in the cell 10 is drained into the tank 12. Argon gas from the argon gas source 16 is supplied to the lower compartment of cell 10 and the sodium storage tank 12 through valves 17b and 17c, respectively, as a cover gas.

The parts in contact with molten sodium, including the cell 10 and the sodium storage tank 12 are provided with a heating means including a heater and a heat insulating wall 21. In FIG. 1, the heating means is partially shown only at the cell 10.

In the present battery with such structure, the capsule 5 of β-alumina containing molten sulfur is inserted in the cell 10 containing molten sodium in the lower compartment of the cell without any special sealing mechanism. That is, a flanged projection 22 is provided around the capsule 5 at a given level, and only fixed to the partitioning plate 23 of the cell 10.

Actuation of the battery is carried out as follows.

The battery is heated to a cell working temperature of 300°-350° C. by the heater 20, and then the battery starts to work. As the discharge starts, both active materials generate heat, and heating by heater 20 is discontinued. Even by discontinuation of heating, the working temperature can be maintained. Particularly, the molten sulfur in the capsule 5 is cooled at the upper part and heated at the lower part and thus is subjected to natural convention, with the result that the molten sulfur circulates through the annular passage in the capsule and the working temperature can be maintained.

The discharge reaction proceeds smoothly (electromotive force: 2.07 V), and as the discharge proceeds, sodium polysulfide having a high melting point and no electron conductivity is ultimately and locally formed, and the active material for the plus pole is solidified, resulting in an increase in inner resistance and a drastic drop in potential.

Charging is the reverse of discharging, a plus pole and a minus pole of a direct current source are connected to the plus pole and the minus pole of the battery and then the battery is charged. As the charging proceeds, free sulfur is increased, and the surfaces of β-alumina and electroconductive material are covered by the free sulfur to form insulating layers. Then, the charging voltage is suddenly increased.

When a decrease in the electromotive force of the battery is found by repetitions of discharging and charging, the molten sodium in the cell 10 is drained into the sodium storage tank 12 through the drain piping 52 and the drain valve 15, and then fresh sodium is supplied to the cell 10, or when the decrease in the electromotive force is caused by the capsule, the capsule 5 is replaced with a fresh capsule.

An accident due to reaction between sodium and sulfur caused by cracking of capsule 5 during the working of battery can be detected by monitoring an abnormal drop of discharge potential. In such case, the drain valve 15 is opened by a signal from an abnormal discharge potential detector 40 to urgently drain all the molten sodium 4 from the cell 10 into the sodium storage tank 12. Then, the cracked capsule 5 is replaced with a fresh one, and then the sodium is supplied to the cell 10 from the tank 12 to restart the battery.

Figure 2:
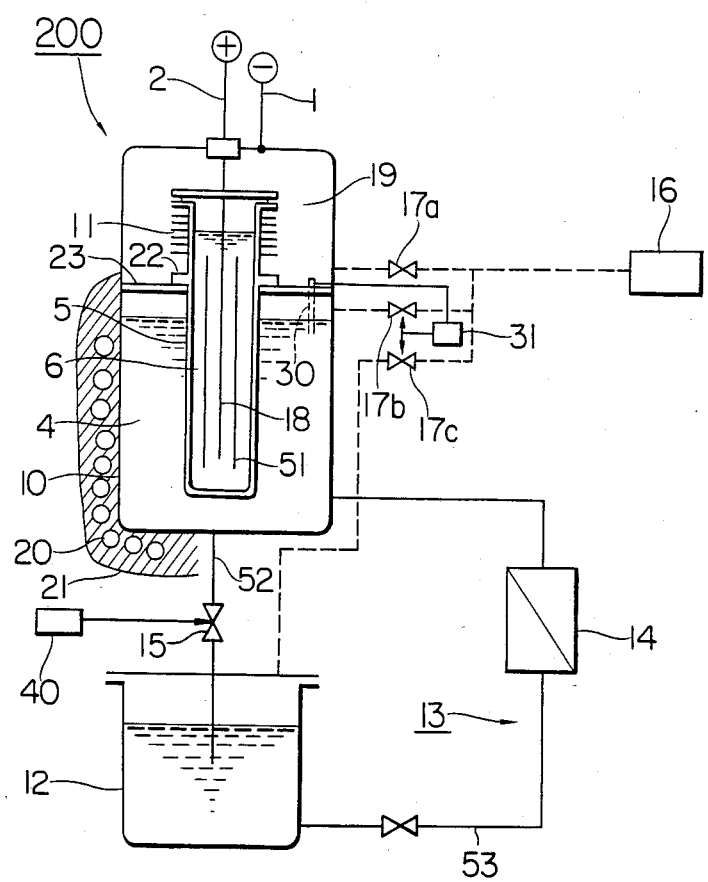
FIG. 2 is a schematic view of the structure of a sodium-sulfur battery according to another embodiment of the present invention.

In FIG. 2 a sodium-sulfur battery 200 according to another embodiment of the present invention is schematically shown, where a sodium circulating system 13 is added to the structure of battery 100 shown in FIG. 1. Same members as in FIG. 1 are indicated with the same reference numerals also in FIG. 2.

In FIG. 2, the sodium drained into the sodium storage tank 12 is returned to the cell 10 through a sodium purifier 14. That is, a circulating system 13 comprises a piping 53 connecting the sodium storage tank 12 to the cell 10 through a sodium purifier 14, which purifies and circulates the sodium from the sodium storage tank 12 to the cell 10. The circulating system 13 is also all made from stainless steel.

The actuation of the battery is carried out as follows: at first, the entire battery is thoroughly preheated to about 200° C. by the heater 20, and then molten sodium is supplied to the cell 10 from the sodium storage tank 12 through the sodium purifier 14. This supplying operation is carried out by a pressure difference in the cover gas introduced into the head space of the cell 20 and the head space of the sodium storage tank 12 by controlling the valves 17b and 17c. That is, a valve control circuit 31 is actuated by a signal from a liquid level meter 30 provided at the upper part of the lower compartment in the cell 10 to close the valves 17b and 17c. With this valve operation, a predetermined amount of sodium is supplied into the cell 10. After the supply of the predetermined amount of sodium, the battery is heated to a working temperature of 300° to 350° C.

The successive operations are carried out in the same manner as given above with regard to the battery of FIG. 1.

The sodium drained in the sodium storage tank 12 is purified through the sodium purifier 14 and returned to the cell 10. The sodium purifier 14 is usually a filter of cold trap, hot trap, or carbon adsorption type.

Figure 3:
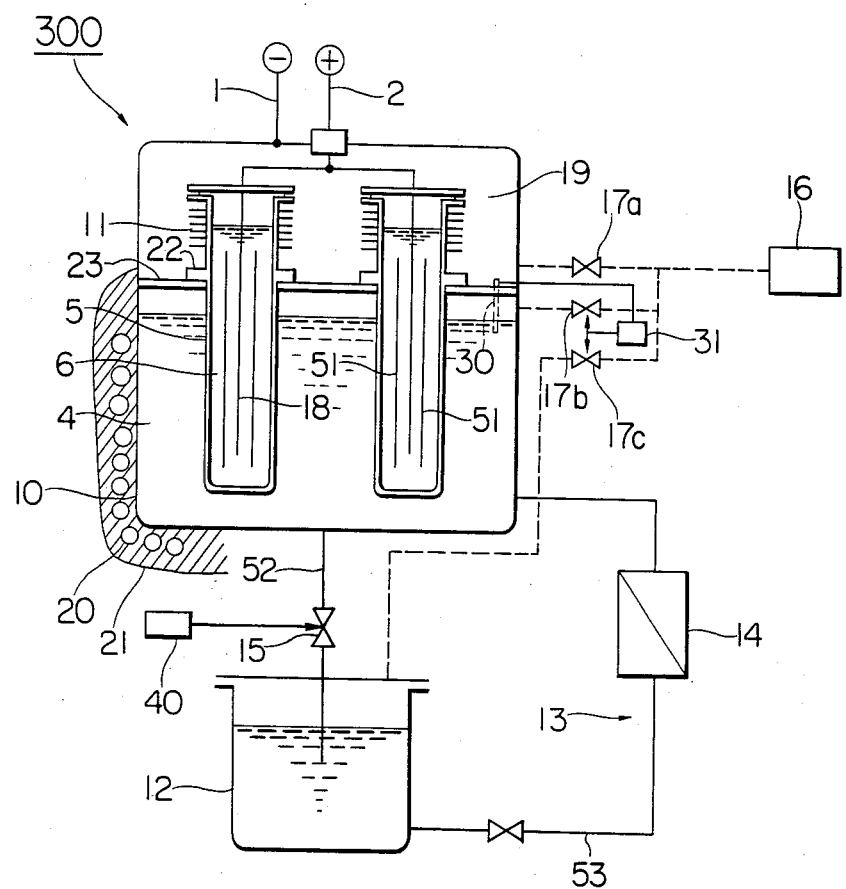
FIG. 3 is a schematic view of the structure of a sodium-sulfur battery according to another embodiment of the present invention.

In FIG. 3, a structure of a battery 300 comprising a plurality of capsules (two in FIG. 3) immersed in common molten sodium according to other embodiment of the present invention is shown with the same members as in FIGS. 1 and 2 being shown with the same reference numerals. With this structure, a compact battery with a large capacity can be fabricated.

According to the embodiments of the present batteries shown in FIGS. 1, 2 and 3, the sulfur as the active material for a plus pole is sealed in a capsule of β-alumina and can be simply inserted into the cell 10 without any contact with other metallic material than β-alumina, with the result of improved corrosion resistance of battery, improved gas tightness and prevention of deterioration of sulfur. Furthermore, according to the embodiments shown in FIGS. 2 and 3, sodium can be purified and reused, with a result of prevention of lowered battery performance. All these effects also lead to prolongation of battery life. Still furthermore, an accident due to reaction between sodium and sulfur caused by damaged β-alumina can be prevented by urgent draining of sodium from the cell 10, with a result of much improved safety.

Figure 4:
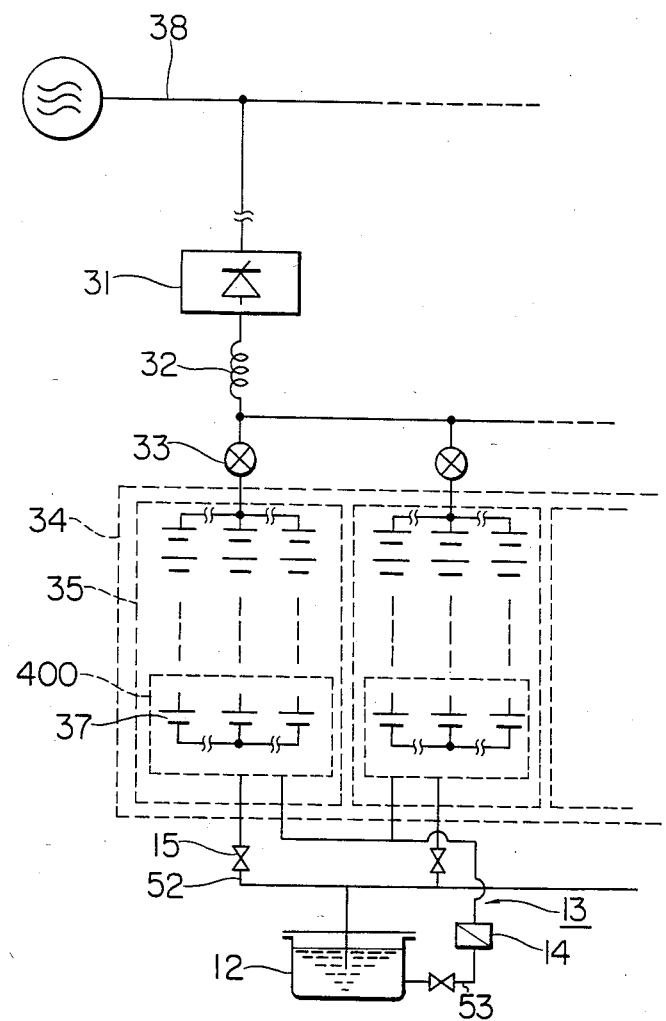
FIG. 4 is a schematic view of a power storage system using the sodium-sulfur batteries according to the present invention.

In FIG. 4, one embodiment of applying the present sodium-sulfur batteries to a power storage system is schematically shown. In modules 400, a plurality of batteries 37 each corresponding to the battery structures 300 of FIG. 3 are connected in parallel to one another. A plurality of modules 400 are further connected in series to one another, thereby forming a string 35. A plurality of strings 35 are further connected in parallel to one another, thereby forming a unit 34. In this case, the sodium is common in each module 400. Breakers 33 are each provided at the individual strings 35. The strings 35 are connected to a power line 38 through the breakers 33, a common direct current reactor 32 and a common converter 31. The direct current reactor 32 is a filter for flattening the rectified wave form when electrically charged into the batteries, and the converter 31 comprises a semiconductor such as thyristor, etc., a transformer for adjusting voltage, etc. and converts AC into DC at the charging and DC to AC at the discharging.

The common sodium as the active material for a negative pole in the batteries 37 in the individual modules 400 in equal potential level rows can be drained into common sodium storage tanks 12 through drain pipings 52 and drain valves 15, and the sodium in the common sodium storage tanks 12 can be returned to the individual modules 400 through common sodium purifiers 14.

By providing a power storage system using the present sodium-sulfur batteries in a substation, charging and discharging can be repeated according to fluctuations in distribution load, whereby an effect on flattening a power source load can be obtained. Thus, a load fluctuation in the power generating facility is lowered. By using the sodium circulation system including the common sodium storage tanks and common sodium purifiers in power storage by sodium-sulfur batteries, the present power storage system becomes compact and a large power storage capacity can be obtained very economically.

In the foregoing embodiments, the sodium circulation is carried out by a gas pressure difference, and it can be also carried out by a sodium driving facility such as an electromagnetic pump, etc. provided in the circulating system, whereby sodium purification can be carried out during the working of the battery.

According to the present invention, sodium can be urgently drained from the cell at an accident due to the reaction between sodium and sulfur, and sodium and sulfur can be instantly separated from each other. Thus, the safety of the battery can be much increased.

What is claimed is:

1. A sodium-sulfur battery which comprises a molten sodium chamber containing molten sodium as an active material for a minus pole and having a minus pole, at least one molten sulfur chamber containing molten sulfur as an active material for a plus pole and having a plus pole, both said chambers being partitioned by a sodium ion-permeating solid electrolyte, a sodium storage tank communicating with the molten sodium chamber, and a draining mechanism for withdrawing the molten sodium from the molten sodium chamber to the sodium storage tank, when desired, wherein said draining mechanism includes means for detecting when said molten sodium directly contacts said molten sulfur through said sodium ion-permeating solid electrolyte, said draining mechanism also including means, cooperating with said means for detecting, for withdrawing the molten sodium from the molten sodium chamber to the sodium storage tank when said means for detecting detects direct contacting between the molten sodium and molten sulfur through the sodium ion-permeating solid electrolyte.

2. A sodium-sulfur battery which comprises a molten sodium chamber containing molten sodium as an active material for a minus pole and having a minus pole, at least one molten sulfur chamber containing molten sulfur as an active material for a plus pole and having a plus pole, both said chambers being partitioned by a sodium ion-permeating solid electrolyte, a sodium storage tank communicating with the molten sodium chamber, a draining mechanism for withdrawing the molten sodium from the molten sodium chamber to the sodium storage tank, when desired, and a sodium circulating mechanism for purifiying and returning the sodium from the sodium storage tank to the molten sodium chamber, wherein said draining mechanism includes means for detecting when said molten sodium directly contacts said molten sulfur through said sodium ion-permeating solid electrolyte, said draining mechanism also including means, co-operating with said means for detecting, for withdrawing the molten sodium from the molten sodium chamber to the sodium storage tank when said means for detecting detects direct contacting between the molten sodium and molten sulfur through the sodium ion-permeating solid electrolyte.

3. A sodium-sulfur battery according to claim 1 or 2, wherein the draining mechanism comprises a piping communicating the molten sodium chamber to be sodium storage tank, and a drain valve provided in the piping, and wherein said means for detecting and means for withdrawing include a means for detecting an abnormal electric discharge of the battery and controlling the drain valve.

4. A sodium-sulfur battery according to claim 1 or 2, wherein the molten sulfur chamber is a capsule of the sodium ion-permeating solid electrolyte in which the molten sulfur is filled, and the capsule is detachably inserted in the molten sodium chamber.

5. A sodium-sulfur battery according to claim 1 or 2, wherein the solid electrolyte is $\beta$-alumina.

6. A sodium-sulfur battery according to claim 1 or 2, wherein a hollow cylinder is provided around the plus pole in the molten sulfur chamber, thereby the molten sulfur being circulated throughout the chamber by convection.

7. A sodium-sulfur chamber according to claim 1 or 2, wherein the molten sulfur is impregnated in a electroconductor material.

8. A sodium-sulfur battery according to claim 7, wherein the electroconductor material is carbon felts.

9. A sodium-sulfur battery according to claim 1 or 2, wherein a cooling chamber surrounding the upper part of the molten sulfur chamber is provided on the top end of the molten sodium chamber, the cooling chamber being provided with fins on the outer surface of the upper part of the molten sulfur chamber.

10. A sodium-sulfur battery according to claim 9, wherein inert gas-introducing pipings to the cooling chamber, the head space in the molten sodium chamber and the head space in the sodium storage tank are provided.

11. A sodium-sulfur battery according to claim 10, wherein the molten sodium is circulated between the sodium storage tank and the molten sodium chamber by a pressure difference in the inert gas between the head space in the molten sodium chamber and the head space in the sodium storage tank.

12. A sodium-sulfur battery according to claim 1 or 2, wherein the molten sodium chamber, the sodium storage tank and the pipings communicating therebetween are surrounded by a heating means.

13. A sodium-sulfur battery according to claim 2, wherein a sodium purifier is provided in the sodium circulating mechanism.

14. A sodium-sulfur battery according to claim 13, wherein the sodium purifier is a filter of cold trap, hot trap or adsorption type.

15. A sodium-sulfur battery according to claim 1 or 2, wherein said draining mechanism includes a piping communicating the molten sodium chamber, at the bottom thereof, to said sodium storage tank.

16. A sodium-sulfur battery according to claim 15, wherein said storage tank is positioned below the molten sodium chamber so that the molten sodium can be drained into the storage tank.

17. A sodium-sulfur battery according to claim 1 or 2, including a plurality of said molten sulfur chambers in said molten sodium chamber.

18. A sodium-sulfur battery according to claim 4, wherein the molten sulfur is sealed in said molten sulfur chamber.

19. A sodium-sulfur battery according to claim 1 or 2, further including pumping means for pumping the molten sodium between the molten sodium chamber and the sodium storage tank.

20. A sodium-sulfur battery according to claim 1 or 2, wherein said drain mechanism includes means for detecting when said molten sodium directly contacts said molten sulfur through said sodium ion-permeating solid electrolyte, said drain mechanism also including means, co-operating with said means for detecting, for withdrawing the molten sodium from the molten sodium chamber to the sodium storage tank when said means for detecting detects direct contacting between the molten sodium and molten sulfur through the sodium ion-permeating solid electrolyte.

21. A power storage system using sodium-sulfur batteries, which comprises a plurality of sodium-sulfur batteries each comprising a common molten sodium chamber containing molten sodium as an active material for a minus pole and having a minus pole, at least one molten sulfur chamber containing molten sulfur as an active material for a plus pole and having a plus pole, both said chambers for each battery being partitioned by a sodium ion-permeating solid electrolyte, the plurality of sodium-sulfur batteries being connected in parallel to one another, thereby forming a module, a plurality of the modules being connected in series to one another, thereby forming one string, a plurality of the strings being connected in parallel to one another, thereby forming one unit, the strings each being connected to a power line through individual breakers, a common direct current reactor, and a common converter; common sodium tanks each communicating with the common molten sodium chambers of the individual modules in equal potential level rows through individual sodium draining mechanisms, wherein each of the draining mechanisms includes means for detecting when said molten sodium directly contacts said molten sulfur through said sodium ion-permeating solid electrolyte, said draining mechanism also including means, co-operating with said means for detecting, for withdrawing the molten sodium from the molten sodium chamber to the sodium storage tank when said means for detecting detects direct contacting between the molten sodium and molten sulfur through the sodium ion-permeating solid electrolyte; and sodium circulating mechanisms for purifying and returning sodium from the common sodium storage tanks to the common molten sodium chambers of the individual modules in corresponding equal potential level rows.

22. A power storage system according to claim 21, wherein the draining mechanisms each comprise a piping communicating the common molten sodium chamber to the sodium storage tank, and a drain valve provided in the piping, and wherein said means for detecting and means for withdrawing include a means for detecting an abnormal electric discharge of the battery and controlling the drain valve.

23. A power storage system according to claim 21, wherein the molten sulfur chamber is a capsule of the sodium ion-permeating solid electrolyte in which the molten sulfur is filled, and the capsule is detachably inserted in the common molten sodium chamber.

24. A power storage system according to claim 21, wherein the solid electrolyte is $\beta$-alumina.

25. A power storage system according to claim 21, wherein a hollow cylinder is provided around the plus pole in the molten sulfur chamber, thereby the molten sulfur is circulated throughout the chamber by convection.

26. A power storage system according to claim 21, wherein a sodium purifier is provided in the sodium circulating mechanism.

* * * * *